(12) United States Patent
Vijayakumar et al.

(10) Patent No.: US 12,739,250 B1
(45) Date of Patent: Sep. 15, 2026

(54) USER-DEFINED NETWORK CONNECTORS BETWEEN SERVERLESS FUNCTIONS AND ISOLATED CLOUD RESOURCES

(71) Applicant: Amazon Technologies, Inc., Seattle, WA (US)

(72) Inventors: Dharani Sankar Vijayakumar, Palo Alto, CA (US); Robert Laks, Seattle, WA (US); Sushant Bhatia, Kirkland, WA (US); Ravi S Nagayach, Aurora, IL (US); Prashant Kumar Singh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 470 days.

(21) Appl. No.: 18/065,544

(22) Filed: Dec. 13, 2022

(51) Int. Cl.
*H04L 9/40* (2022.01)

(52) U.S. Cl.
CPC .......... *H04L 63/10* (2013.01); *H04L 63/0263* (2013.01)

(58) Field of Classification Search
None
See application file for complete search history.

(56) References Cited

U.S. PATENT DOCUMENTS

2011/0302133 A1* 12/2011 Kuruganti .............. G06F 16/25 707/E17.005
2019/0007458 A1 1/2019 Shulman et al.
2020/0021591 A1 1/2020 Hecht
2020/0241999 A1 7/2020 Guim Bernat et al.
2020/0412707 A1* 12/2020 Siefker ................ H04L 63/101
2021/0200527 A1 7/2021 Sanchez et al.
2021/0329003 A1 10/2021 Segal et al.
2024/0195811 A1 6/2024 Vijayakumar et al.

OTHER PUBLICATIONS

U.S. Appl. No. 18/065,551, User-Defined Network Connectors Between Serverless Functions and Isolated Cloud Resources, filed Dec. 13, 2022.

* cited by examiner

*Primary Examiner* — Kevin S Mai
(74) *Attorney, Agent, or Firm* — Knobbe, Martens, Olson & Bear, LLP

(57) ABSTRACT

Systems and methods are described for facilitating cross-account network traffic between serverless function executions and isolated cloud resources within virtualized network environments. Virtualized network environments, by default, may be isolated such that external traffic is not permitted to enter the environment. Permissions for traffic that may enter the environment are often set on the basis of network addresses. In the context of serverless functions, such permissions may be difficult to establish because executions of serverless functions can occur on a dynamically selected environment without a fixed network address. The present disclosure provides for creation of user-defined connectors that facilitate routing of network traffic between executions of serverless functions and user virtualized network environments without requiring that routing occur on the bases of network addresses. In some instances, connectors may route between functions owned by a first account and environments owned by a second account thus providing for cross-account communication.

20 Claims, 7 Drawing Sheets

USER-DEFINED NETWORK CONNECTORS BETWEEN SERVERLESS FUNCTIONS AND ISOLATED CLOUD RESOURCES

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

DETAILED DESCRIPTION

Figure 1:
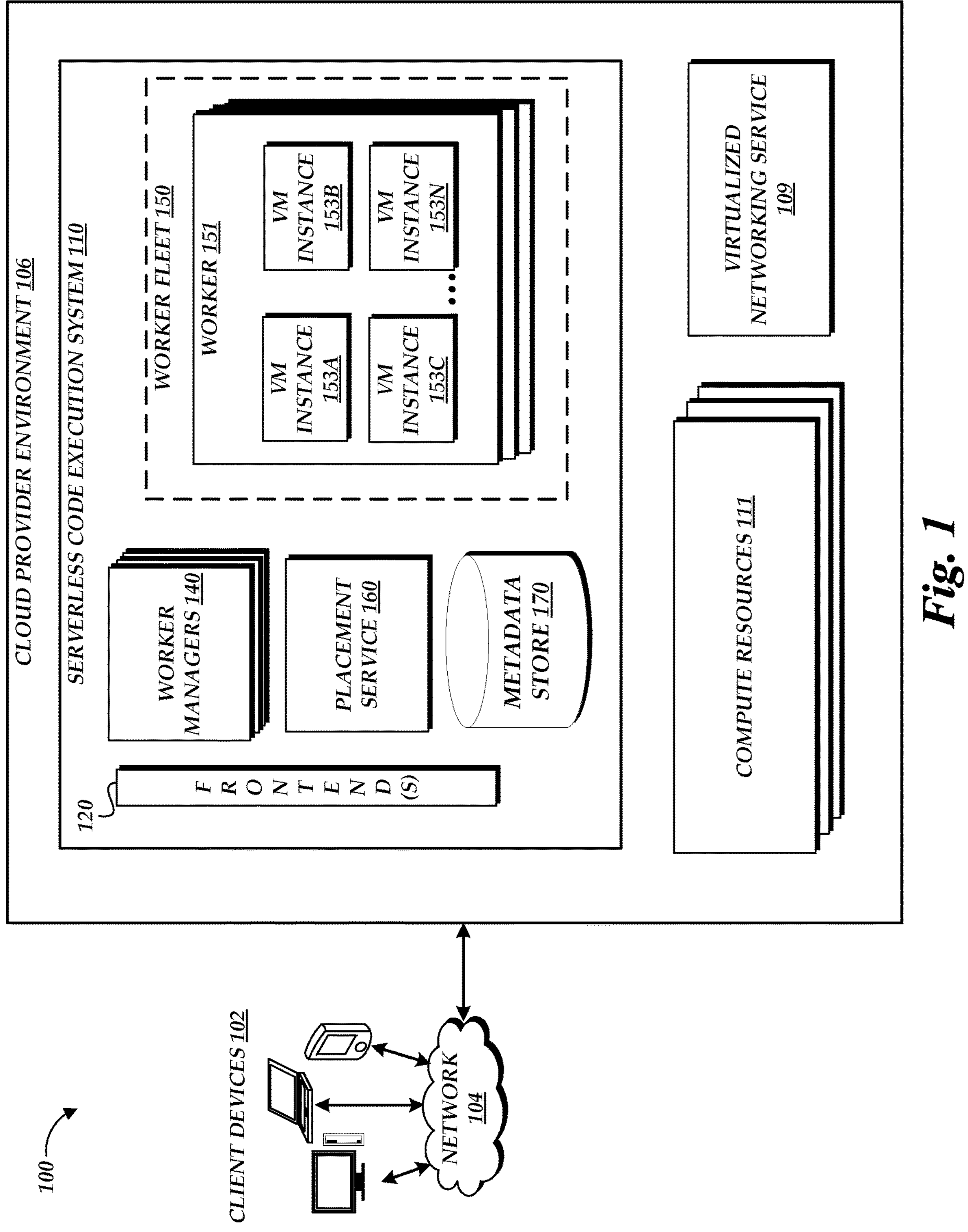
FIG. 1 is a block diagram depicting an illustrative environment in which a cloud provider environment enable secure network communication between executions of serverless functions and user virtualized network environments using user-defined connectors.

Generally described, aspects of the present disclosure relate to providing user-defined network connectors between serverless functions and isolated cloud resources. Specifically, embodiments of the present disclosure enable a user, such as the owner of a serverless function, to create and manage a network connector that facilitates transmission of network traffic between executions of a serverless function and isolated cloud resources in a virtualized network environment, such as compute and storage resources in a "virtual private cloud" or other isolated environments. Generally described, serverless computing enables on-demand execution of user-specified code (a "function") without requiring a user to create, configure, or manage an execution environment (such as a virtual machine) on which the code is executed. While removing this need to manage an execution environment may be beneficial to end users in many ways, such as by reducing complexity, increasing an ability to rapidly scale to meet demand, and increasing efficiency, lack of direct access to an execution environment can complicate some aspects of code execution. For example, traditional networking technologies often operate on the basis of low-level network identifiers, such as media access control (MAC) or Internet Protocol (IP) addresses, that are assigned to individual execution environments. Because a serverless computing system, rather than end user, manages such environments, it can be difficult for end users to control network transmissions from or to code executions on such a serverless computing system. For example, an end user may desire to provide certain code executions with access to isolated cloud resources, such as databases, data stores, web services, or the like in a virtualized, isolated network environment (referred to herein simply as an "virtualized network environment," which may also be various referred to as a virtual private cloud (VPC) environment, virtual cloud network (VCN), virtual network (VNet) environment, etc.). Traditional networking technologies reliant on MAC or IP addresses may be unable to do so, since a serverless computing system may not guarantee that code is executed on an environment with a given MAC or IP address. Embodiments of the present disclosure address this problem by providing for user-defined network connectors between serverless functions and isolated cloud resources, which network connectors can be created and managed by an end user to control access to isolated cloud resources by code executions on a serverless system.

As described herein, a serverless code execution system (which may also be referred to as an "on-demand code execution system") enables rapid execution of source code, which may be supplied by users of the on-demand code execution system. For example, a user may submit code in a specific programming language (e.g., the PYTHON™ language) that, when executed, implements network-based processing for a user-facing application (e.g., a mobile device "app"). The serverless code execution system can then enable the user to submit "calls" or "invocations" to execute that code, at which point the system will securely execute the code to provide the desired functionality. Embodiments for providing a serverless code execution system are provided, for example, in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference. In brief, an on-demand code execution system can enable client devices to submit executable code (e.g., source code) implementing desired functionality, which functionality is generally referred to herein as a "task" or a "function." The system can further enable a client device to define one or more triggers that result in execution of the code on the system. For example, a client device may request that each time a specific application programming interface (API) call is made, the code should be executed on the serverless code execution system. When a trigger occurs, the serverless code execution system can configure an execution environment for the code, which may correspond to a virtual machine instance, a software container, or other logically isolated environment in which code can execute. The serverless code execution system can then execute the code within the environment, resulting in a task execution. When the task execution completes, the serverless code execution system can remove the environment, thus freeing computing resources for other task executions.

Unlike some other network-based services, a serverless code execution system can remove the need for a user to maintain or configure a computing device, either virtual or physical, to support code execution. Due to this lack of need for a user to maintain a device, serverless code execution systems are referred to as "serverless" (though of course the serverless code execution system itself, as opposed to individual users, may maintain servers to support code execution).

A serverless code execution system—which may be generally referred to herein as a serverless computing system—may be provided as part of a variety of network-based services. For example, a serverless computing system may be provided as part of a hosted computing environment providing a number of rapidly provisioned and released computing resources. A hosted computing environment may also be referred to as a "cloud computing environment." Illustratively, a cloud computing environment may include a distributed set of physical computing resources that can be rapidly acquired for use by users of the cloud computing environment. Often, the cloud computing environment can provide resources to users in the form of virtualized compute resources, such as virtual machines, virtual storage volumes, various other functionalities implemented using virtual machines or storage volumes, etc. In addition, a cloud computing environment may provide for virtualized networking functionality. For example, the cloud computing environment can include a variety of distributed systems in communication via a physical substrate network. The cloud computing environment may define multiple virtualized logical networks on top of the physical substrate network, via which resources on the environment can communicate. For example, the cloud computing environment may enable clients to acquire access to virtual computing resources (e.g., virtual machines) that are provided with network addresses in a logical network. In some cases, these network addresses may be isolated from other resources. For example, a set of network resources may share a specific subnet (e.g., a /24 IP version 4 subnet in Classless Inter-Domain Routing or CIDR notation) and have no access to network resources outside that subnet, or access limited by various network functionalities (e.g., a firewall). Thus, using a cloud computing environment, a user may acquire a variety of compute resources (such as virtual compute resources) and arrange such resources into an isolated network. As a result, users may acquire computing resources similar to those provided by traditional data centers, without requiring that the end user physically manage computing devices, networks, or the like.

In many instances, users may desire that serverless functions, when executed, access computing resources of an isolated network. For example, a user may author code that depends on data stored within a storage volume accessible only via an isolated network, and wish to execute such code as a serverless function.

One mechanism for enabling serverless functions to communicate with isolated networks is to directly provision an execution environment for a serverless function with access to the isolated network. For example, an environment may be assigned an IP address within the isolated network and thus access resources within the isolated network. However, directly providing an environment with access to an isolated network may have various drawbacks. For example, it may be difficult from the point of view of the isolated network to distinguish an execution environment for a serverless function from other objects within the network, complicating the placement of restrictions on network access by the serverless function. Moreover, providing an environment with direct access to an isolated network may limit the number of environments on a physical host computing device hosting the execution environment. For example, a given physical host computing device may be able to support a limited number of IP addresses for environments hosted on the host computing device, thus limiting how many direct connections may exist between the environments and various isolated networks, and accordingly limiting scalability of environments on host computing devices.

An alternative method for facilitating network communications between execution environments of serverless functions and isolated network (and network objects or resources therein) is to provide a connector between a network of the execution environment and the target isolated network that the environment is intended to access. As described herein, a connector can generally represent a logical network object that facilitates communication between isolated subnetworks on a cloud computing environment on the basis of knowledge of the virtualized logical networks or other virtualization or cloud metadata, as opposed to the routing rules within a network. For example, a router or firewall operating within a virtualized network may have no knowledge that a substrate network exists, that other virtualized networks exist, or the like, and thus may be unable to implement functionality other than with respect to virtualized attributes of the virtualized network (e.g., virtualized IP addresses). A connector, in contrast, may have knowledge of various metadata attributes of a virtualized network or cloud environment. For example, each virtualized network within a cloud computing environment may be assigned a unique identifier, and a substrate network may include routers or other network components that facilitate routing between virtualized networks on the basis of such unique identifiers. In accordance with embodiments of the present disclosure, a connector may facilitate transmission of network information between a first virtualized network hosting an execution environment of a serverless function and a second virtualized network hosting end user network resources, thus enabling communication between the function and the resources in a manner similar to a router between physical networks (but, unlike a router, operating on metadata regarding the two connected virtualized networks, as opposed to an IP network division of the networks).

One possible mechanism when using connectors to connect serverless function executions to target isolated networks is to configure a serverless computing system to transparently creates and manages connectors on behalf of serverless functions. For example, an end user that owns a given serverless function may specify that the function should have access to their isolated network (and potentially conditions for such access), and the serverless computing system may, on creation of an execution environment for the function in a first isolated network (e.g., dedicated to serverless function environments), transparently create a connector between the first isolated network and the end user's isolated network. However, such transparent creation may limit the ability of the end user to independently manage the connector. For example, without explicitly surfacing the existence of a connector to an end user and allowing direct management of the connector by the end user, the serverless computing system may be forced to infer attributes of the connector from attributes of the serverless function. As an illustration, assume that a serverless computing system provides various functionalities distinct from those functionalities provided by user-defined code, such as an ability to collect log data regarding serverless function executions (without implementing logging in user-defined code of the function). Further assume that an end user wishes for such log data of a serverless function to by written to a logging endpoint within their isolated network. If the serverless computing system does not provide for explicit management of connectors as distinct from the serverless function generally, the end user may be required to permit the serverless function generally to access the logging endpoint within the isolated network. This may undesirably also permit the user-defined code of the serverless function (as opposed to merely the logging functionality provided inherently by the serverless computing system) to access the logging endpoint. As another example, an end user may wish to place constraints on a type or volume of traffic transmitted by user-defined code implemented as a serverless function, but not wish to apply such constraints to administrative traffic generated by the serverless computing system and not directly by the user-defined code. If a connector is not explicitly surfaced to an end user, the serverless computing system may accept only traffic conditions or permissions for the serverless function generally, without ability to differentiate between traffic of an execution of the user-defined code and other traffic of the serverless computing system generated ancillary to such execution. Thus, providing transparent connectors undifferentiated from a serverless function may unnecessary limit the use of such connectors.

The present disclosure solves the above-noted problems and relieves the above-noted difficulties by providing for user-defined and managed connectors between serverless function executions and isolated networks (e.g., VPCs). Specifically, as disclosed herein, a cloud computing environment providing isolated virtual networks and serverless computing functionality can enable end users of such isolated virtual networks and serverless computing functionality to create and manage connectors that facilitate network communications between isolated virtual networks and serverless functions on the serverless computing functionality. Each connector may be configured to accept network traffic from one or more defined serverless functions (e.g., according to unique identifiers of the functions as assigned by a serverless computing system) and deliver the traffic to a defined isolated network (e.g., according to a unique identifier of the isolated network assigned by the cloud computing environment). In some instances, connectors may be configured to support bi-directional traffic. Moreover, connectors may apply conditions or filters to such traffic, for example by limiting the type or volume of traffic according to a source of the traffic, a destination of the traffic, or both. In this manner, connectors may implement functionality similar to a network appliance, such as a router or firewall. However, unlike a traditional network appliance that operates on the basis of, e.g., network addresses, a connector may operate on the basis of cloud-assigned metadata, such as a serverless function identifier, isolated network identifier, or other cloud resource identifier. Accordingly, traffic filtering and control may be implemented even when traditional network information is unknown or rapidly changes (e.g., due to an IP address of a serverless function being unknown when a connector is created).

In some embodiments, a connector connects a serverless function and isolated network owned by the same entity (e.g., a given account on the cloud computing system, such as an individual). In other embodiments, a connector connects a serverless function owned by a first entity to an isolated network owned by a second entity. Illustratively, a serverless function may be owned by a Software-as-a-Service (SaaS) provider that authored the serverless function in order to provide a given functionality to end users of the SaaS provider. As an example, a SaaS provider may provide security or regulatory compliance auditing, and may thus author a serverless function that, when executed, inspects one or more network resources (e.g., storage devices, virtual machines, web servers, application programming interfaces (APIs), etc.) for security or compliance risks or violations. To implement such functionality, the serverless function may require access to an isolated network of a target end user (e.g., an individual or company wishing their network resources to be audited). One mechanism for providing such access would be for the target end user to provide credentials for the isolated network to the SaaS provider; however, this is often undesirable as it may require heightened trust of the SaaS provider by the target end user. Embodiments of the present disclosure provide a different solution, whereby a cloud computing environment providing both the isolated network and serverless computing functionality enables either or both the owner of a serverless function (such as a SaaS provider) and an owner of an isolated network (such as an end user of the SaaS provider) create and manage a network connector enabling network communication between the serverless function and the isolated network. Either or both the owner of the serverless function and the owner of the isolate network may specify restrictions on traffic flowing through the connector. For example, a connector may adopt a minimum-mutually-allowed permissions set, such that traffic flows through a connector only if permitted by permissions of both an owner of a serverless function and an owner of an isolated network. Thus, both the owner of the serverless function and the owner of the isolated network are enabled to control traffic flowing to and from the respective function and network, ensuring security of such communications. In one embodiment, connectors are "owned" by owners or a serverless function, and as such can for example create and destroy connectors. In another embodiment, connectors are "owned" by owners of an isolated network. In either instance, a connector may enable permissions to be specified by a non-owning party (e.g., the owner of the isolated network, when a connector is owned by the owner of the serverless function, or vice versa). Accordingly, a connector can facilitate highly controlled and secure cross-owner (e.g., cross-account) network traffic between serverless functions and isolated networks.

As will be appreciated by one of skill in the art in light of the present disclosure, the embodiments disclosed herein improve the ability of computing systems, such as cloud computing systems, to provide on-demand code execution on behalf of users while facilitating access to network resources within isolated virtualized networks. Moreover, the presently disclosed embodiments address technical problems inherent within computing systems; specifically, the difficulty of enabling secure communication between virtualized resources, particularly dynamically created resources such as execution environments supporting execution of serverless functions. These technical problems are addressed by the various technical solutions described herein, including the use of user-defined connectors facilitating communication between serverless function executions and virtualized network resources subject to permissions or conditions specified by an owner of a serverless function, an owner of virtualized network resources, or both. Thus, the present disclosure represents an improvement in cloud computing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which embodiments of the present disclosure may be implemented. Specifically, in FIG. 1, client devices 102 may utilize a network 104 to interact with a cloud provider environment 106, including a serverless code execution system 110 facilitating execution of serverless functions, compute resources 111 acquirable by users for implementation of various network-accessible functionalities, and a virtualized networking service 109 enabling creation of virtualized isolated networks through which compute resources 111 are accessible. In accordance with embodiments of the present disclosure, the cloud provider environment 106 may facilitate creation of logical network connectors, provided for example by the virtualized networking service 109, that facilitate network communications between serverless functions as executed by the serverless code execution system 110 and compute resources 111 as included in virtualized isolated networks provided by the virtualized networking service 109.

By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The cloud computing environment 106 may provide the client devices 102 with one or more user interfaces, command-line interfaces (CLIs), application programing interfaces (APIs), and/or other programmatic interfaces for utilizing services provided by the cloud computing environment 106. Although one or more embodiments may be described herein as using a user interface, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices that access respective services provided by the cloud computing environment 106.

The client devices 102 and cloud computing environment 106 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In FIG. 1, compute resources 111 can correspond to a variety of network-accessible resources provided by the cloud provider environment 106 for use by users. For example, compute resources 111 can include virtual machines hosted by physical computing devices, "bare metal" instances corresponding to physical computing devices, data storage resources (such as object storage collections, block storage volumes, databases, or the like), computer-provided services (such as web services, APIs, data queues, data processing services), or the like. Each compute resource 111 may represent a physical compute resource provisioned to (and thus "owned" by) a given user of the cloud computing environment 106 or a virtualized compute resources supported by an underlying physical resource and similar provisioned to a user. The cloud provider environment 106 can secure each compute resource 111 such that it is inaccessible by any entity other than the owner, including the cloud provider environment 106. Thus, the compute resources 111 may provide functionality similar to or the same as physical compute resources operated by a user.

Illustratively, various components of the cloud provider environment 106 are in communication with one another via a substrate network (not shown in FIG. 1). The substrate network may be dedicated to management and operation of the cloud provider environment 106, and thus inaccessible to, for example, compute resources 111 or by the network 104. Rather, the substrate network can support virtualized logical networks that operate "on top" of the substrate network to facilitate secure communication between particular elements of the cloud provider environment 106. These virtualized logical networks are illustratively dynamic and reconfigurable, such that communication between certain elements or components of the cloud provider environment 106 can be controlled by reconfiguration of virtualized logical networks, as opposed to physical modification of the substrate network.

As noted above, the cloud provider environment 106 can facilitate creation of virtualized, isolated networks via which compute resources 111 communicate with one another and potentially external networks, such as network 104. Specifically, the cloud provider environment 106 includes a virtualized networking service 109 configured to enable creation of isolated networks within the cloud provide environment 106 (each isolated network representing a virtualized logical network supported by an underlying physical substrate network). Like compute resources 111, the isolated networks created by the virtualized networking service 109 may be "owned" by users of the cloud provider environment 106, such that traffic on the isolated network is inaccessible by any entity other than the owner, including the cloud provider environment 106. Thus, the virtualized networking service 109 can enable creation of private networks that are functionally similar to or the same as physical networks built by a user.

In addition to the compute resources 111 and the virtualized network service 109, the cloud provider environment 106 includes a serverless code execution system 110. In FIG. 1, users, by way of client computing devices 102, may interact with the serverless code execution system 110 to provide source code, and establish rules or logic defining when and how such code should be executed on the serverless code execution system 110, thus establishing a "task" or "function." For example, a user may wish to run a piece of code in connection with a web or mobile application that the user has developed. One way of running the code would be to acquire virtual machine instances from service providers who provide infrastructure as a service (e.g., as compute resources 111), configure the virtual machine instances to suit the user's needs, and use the configured virtual machine instances to run the code. To avoid the complexity of this process, the user may alternatively provide the code to the serverless code execution system 110, and request that the on serverless code execution system 110 execute the code using one or more execution environments that are managed by the system 110. The serverless code execution system 110 can handle the acquisition and configuration of compute capacity (e.g., containers, instances, etc., which are described in greater detail below) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying).

To enable interaction with the serverless code execution system 110, the system 110 includes multiple frontends 120, which enable interaction with the serverless code execution system 110. In an illustrative embodiment, the frontends 120 serve as a "front door" to the other services provided by the serverless code execution system 110, enabling users (via client computing devices 102) to provide, request execution of, and view results of computer executable source code. The frontends 120 include a variety of components to enable interaction between the serverless code execution system 110 and other computing devices. For example, each frontend 120 may include a request interface providing client computing devices 102 with the ability to upload or otherwise communication user-specified code and associated data sets to the serverless code execution system 110 (e.g., in the form of a disk image) and to thereafter request execution of that code. In one embodiment, the request interface communicates with external computing devices (e.g., client computing devices 102, compute resources 111, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks" or "functions," while specific executions of that code are referred to as "task executions," "function executions," "code executions," or simply "executions." Source code for a task may be written, by way of non-limiting example, in JavaScript (e.g., node.js), Java, Python, and/or Ruby (and/or another programming language). Functions may be "triggered" for execution on the serverless code execution system 110 in a variety of manners. In one embodiment, a user or other computing device may transmit a request to execute a task, which can generally be referred to as "call" to execute of the task (e.g., a "task call," a "function call," etc.). Such calls may include an identifier of the task to be executed and one or more arguments to be used for executing the task. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a function, an end user may submit (e.g., to a frontend 120) code for the function and associated data to be used to execute the function. In one embodiment, the code is provided in the form of a disk image containing the code and other data that the code may use during execution. Illustratively, creation of a function may result in the frontend 120 creating metadata for the function, which defines for example the user creating the function, the disk image used to facilitate execution of the function, trigger conditions for the function, and the like. In one embodiment, functions may be versioned, with function metadata identifying the available versions and at least some other metadata for a function may vary across versions. For example, different versions may be associated with different disk images. Function data and metadata is illustratively stored in the task data store 170. The task data store 170 correspond to any persistent data store. In one embodiment, the task data store 170 is implemented as logical storage on a cloud storage service, such as an object storage system. An example of such an object storage system is AMAZON™'s SIMPLE STORAGE SERVICE™ (or "S3™"). In accordance with embodiments of the present disclosure, user-submitted code may correspond to functions for conducting stream data processing.

After a user has created a function on the serverless code execution system 110, the system 110 may accept calls to execute that function, which may also be referred to as "function invocations." To handle calls to execute a function, the frontend 120 can include an execution queue, which can maintain a record of requested task executions. Illustratively, the number of simultaneous function executions by the serverless code execution system 110 is limited, and as such, new function executions initiated at the serverless code execution system 110 (e.g., via an API call, via a call from an executed or executing function, etc.) may be placed on the execution queue and processed, e.g., in a first-in-first-out order. In some embodiments, the serverless code execution system 110 may include multiple execution queues, such as individual execution queues for each user account. For example, users of the serverless code execution system 110 may desire to limit the rate of function executions on the serverless code execution system 110. Thus, the serverless code execution system 110 may utilize an account-specific execution queue to throttle the rate of simultaneous function executions by a specific user account. In some instances, the serverless code execution system 110 may prioritize function executions, such that function executions of specific accounts or of specified priorities bypass or are prioritized within the execution queue. In other instances, the serverless code execution system 110 may execute functions immediately or substantially immediately after receiving a call for that function, and thus, the execution queue may be omitted.

In addition to functions executed based on explicit user calls and data from compute resources 111 (or other network entities), the serverless code execution system 110 may in some instances operate to trigger execution of functions independently. For example, the serverless code execution system 110 may operate (based on instructions from a user) to trigger execution of a function at each of a number of specified time intervals (e.g., every 10 minutes).

The frontend 120 can further includes an output interface configured to output information regarding the execution of functions on the serverless code execution system 110. Illustratively, the output interface may transmit data regarding function executions (e.g., results of a function, errors related to the function execution, or details of the function execution, such as total time required to complete the execution, total data processed via the execution, etc.) to the client computing devices 102 or to network services 106, which may include, for example, logging services. The output interface may further enable transmission of data, such as service calls, to network services 106. For example, the output interface may be utilized during execution of a function to transmit an API request to a network service 106 (e.g., to store data generated during execution of the function).

Code executions triggered on the serverless code execution system 110 of FIG. 1 are executed by execution environments hosted by a set of workers 151 within a worker fleet 150. Each worker 151 is illustratively a host device configured to host multiple execution environments, which in FIG. 1 are virtual machine instances 153A-N. Execution environments may alternatively include software containers, sometimes referred to as "OS-level virtualization," another virtualization technology. Thus, where references are made herein to VM instances 153, it should be understood that (unless indication is made to the contrary) a container may be substituted for such instances 153.

As used herein, the term "virtual machine instance" is intended to refer to an execution of software or other executable code that emulates hardware to provide an environment or platform on which software may execute (an "execution environment"). Due to their emulation of hardware, these virtual machine instances are sometimes referred to as "system virtual machines." System virtual machines are different than, for example, process virtual machines that do not emulate hardware. Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

As shown in FIG. 1, each worker 151 may host a number of instances 153A-N. Each instance 153 may be isolated from other instances 153, thus ensuring the security of code executions on the serverless code execution system 110. For example, each instance 153 may be divided by a virtualization boundary, by virtue of the instance 153 being a virtual machine hosted by the worker 151. In addition, each instance 153 may exist within a partitioned user space on the worker 151, which logically partitions resources of the worker 151 among instances 153. Each user space may, for example, represent a "chroot" jail—a known isolation technique for LINUX™ operating systems.

To facilitate rapid execution of code, each worker 151 may be configured to maintain a set of instances 153 in a "pre-warmed" state, being at least partially configured to begin execution of code. For example, instances may be created on the worker and configured with access to computing resources (CPU, RAM, drive storage, etc.). In some cases, it may be impractical or impossible to maintain instances 153 in a fully warmed state for all possible code executions, as executions may be associated with a wide variety of at least partially distinct data sets (e.g., disk images and/or snapshots). Thus, instances 153 may be maintained in a "greatest commonality" for a given group of tasks, such as being provisioned with a set of computing resources common to those tasks, being configured to accept an operating system type used by those tasks, etc.

On receiving instructions to provision an instance 153 to support execution of the task, the worker 151 may adjust the configuration of the instance 153 to support that execution. Specifically, the worker 151 may provision the instance 153 with access to a disk image or snapshot corresponding to the task. In some instances, the worker 151 may retrieve the disk image for the task and store the full image locally. In other instances, the worker 151 may provide to an instance 153 what appears to be full local access to the disk image or snapshot, while "lazily" retrieving portions of that image or snapshot in response to a request to read such portions. Techniques for providing lazy retrieval of image portions are discussed in the U.S. patent application Ser. No. 17/105,250, filed Nov. 25, 2020 and entitled "LOW LATENCY ACCESS TO DATA SETS USING SHARED DATA SET POR- TIONS" (the "'250 Application") the entirety of which is hereby incorporated by reference.

In addition, the system 110 includes a number of components for facilitating distribution of calls to execute a function from frontends 120 to particular VM instances 153. For example, the serverless code execution system 110 includes one or more worker managers 140 configured to manage execution environments (e.g., virtual machine instances) hosted by workers 151 among a worker fleet 150. The worker managers 140—each of which are illustratively implemented as physical or virtual-on-physical devices—illustratively "lease" particular VM instances 153 within the fleet 150, thus gaining operational control to, for example, instruct virtual machine instances 153 to execute code of the function. Thus, on receiving a call to execute a function, a frontend 120 may distribute the call to a worker manager 140, which may identify a currently-leased VM instance 153 in which to implement the function, and cause the instance 153 to implement the function.

In the instance that a worker manager 140 does not currently lease a VM instance 153 corresponding to the called function, the worker manager 140 can contact a placement service 160 to request a lease on an additional instance 153, which is illustratively configured to grant to the worker managers 140 leases to individual VM instances 153. Illustratively, the placement service 160 may maintain state information for VM instances 153 across the fleet 150, as well as information indicating which manager 140 has leased a given instance 153. When a worker manager 140 requests a lease on an additional instance 153, the placement service 160 can identify an appropriate instance 153 (e.g., warmed with software and/or data required to support a call to implement a function) and grant to the manager 140 a lease to that instance 153. In the case that such an instance 153 does not exist, the placement service 160 can instruct a worker 151 to create such an instance 153 (e.g., by creating an instance 153 or identifying an existing unused instance 153, providing the instance 153 with access to a required set of data to support execution, etc.) thereafter grant to the worker manager 140 a lease to that instance 153, thus facilitating execution.

While not shown in FIG. 1, the illustrative environment can further includes one or more network services-either as part of or distinct from the cloud provider environment 106—which can interact with the serverless code execution system or other elements of the cloud provider environment 106. Network services can correspond to network-connected computing devices, such as servers, which generate data accessible to the cloud provider environment 106, receive data from cloud provider environment 106 or otherwise communicate to the cloud provider environment 106. For example, the network services can include web services (e.g., associated with the client computing devices 102, with the serverless code execution system 110, or with third parties), databases, really simple syndication ("RSS") readers, social networking sites, or any other source of network-accessible service or data source. In some instances, network services may be invoked by code execution on the serverless code execution system 110, such as by API calls to the network services.

The cloud provider environment 106 is depicted in FIG. 1 as operating in a distributed computing environment including several computer systems that are interconnected using one or more computer networks (not shown in FIG. 1), which systems operate to provide the cloud provider environment 106. The cloud provider environment 106 could also operate within a computing environment having a fewer or greater number of devices than are illustrated in FIG. 1. Thus, the depiction of cloud provider environment 106 in FIG. 1 should be taken as illustrative and not limiting to the present disclosure. For example, the elements of the cloud provider environment 106 or various constituents thereof could implement various Web services components and/or peer to peer network configurations to implement at least a portion of the processes described herein. The cloud provider environment 106 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In accordance with embodiments of the present disclosure, the virtualized networking service 109 can facilitate communication between serverless function executions, as executing on VM instances 153 and compute resources 111, as existing within virtualized isolated networks, via user-defined connectors. Specifically, owners of a serverless function and/or of isolated networks of compute resources 111 (which owners may be the same entity or different entities) may define connectors that facilitate secure communication between executions of the function and the isolated networks of compute resources 111. Such owners may illustratively interact with the virtualized networking service 109 (either directly of via other interfaces, such as those of the frontend 120) to define connectors, manage a lifecycle of such a connector (e.g., by starting, stopping, or destroying a connector), manage permissions of the connector, and the like. As noted above, use of such user-defined connectors can enable explicit user management of communications between serverless function and compute resources 111, providing for secure communications between these resources and avoiding issues that arise when connectors are transparently to and not manageable by users.

Illustratively, connectors may be enabled at least partly by routing functionality provided by the virtualized networking service 109 and the cloud provider environment 106 generally. For example, network communications initiated within a given virtualized network of the cloud provider environment 106 may be encapsulated for transmission on the substrate network of the cloud provider environment 106. During encapsulation, various additional information regarding the communication may be included in header information of the post-encapsulation communication (e.g., within header values of an IP data packet). Such additional information can include "cloud metadata" that relates to operation of the cloud provider environment 106 or the substrate network, as opposed to operation of a virtualized network or resource. For example, such additional information can include a unique identifier of a virtualized network assigned by the virtualized networking service 109, a unique identifier of a compute resources 111 assigned by the cloud provider environment 106, a unique identifier of a serverless function on the serverless code execution system 110, or the like. The virtualized networking service 109 is illustratively configured to enable routing of network communications at least partly based on such cloud metadata. For example, data may be routed on the substrate network based at least partly on a virtualized network identifier, such that compute resources 111 of the virtualized network appear to communicate within a physical local area network (LAN). In accordance with embodiments of the present disclosure, the virtualized networking service 109 may further provide for routing between isolated virtualized networks by implementing logical connectors that define in whole or part how the virtualized networking service 109 routes communications based on cloud metadata. Illustratively, a connector may define a route between a first virtualized isolated network (associated with a first unique identifier) and a second virtualized isolated network (associated with a second unique identifier) such that traffic of the first virtualized isolated network received at the virtualized networking service 109 and addressed to the second virtualized isolated network is passed by the virtualized networking service 109 to the second virtualized isolated network.

Figure 2:
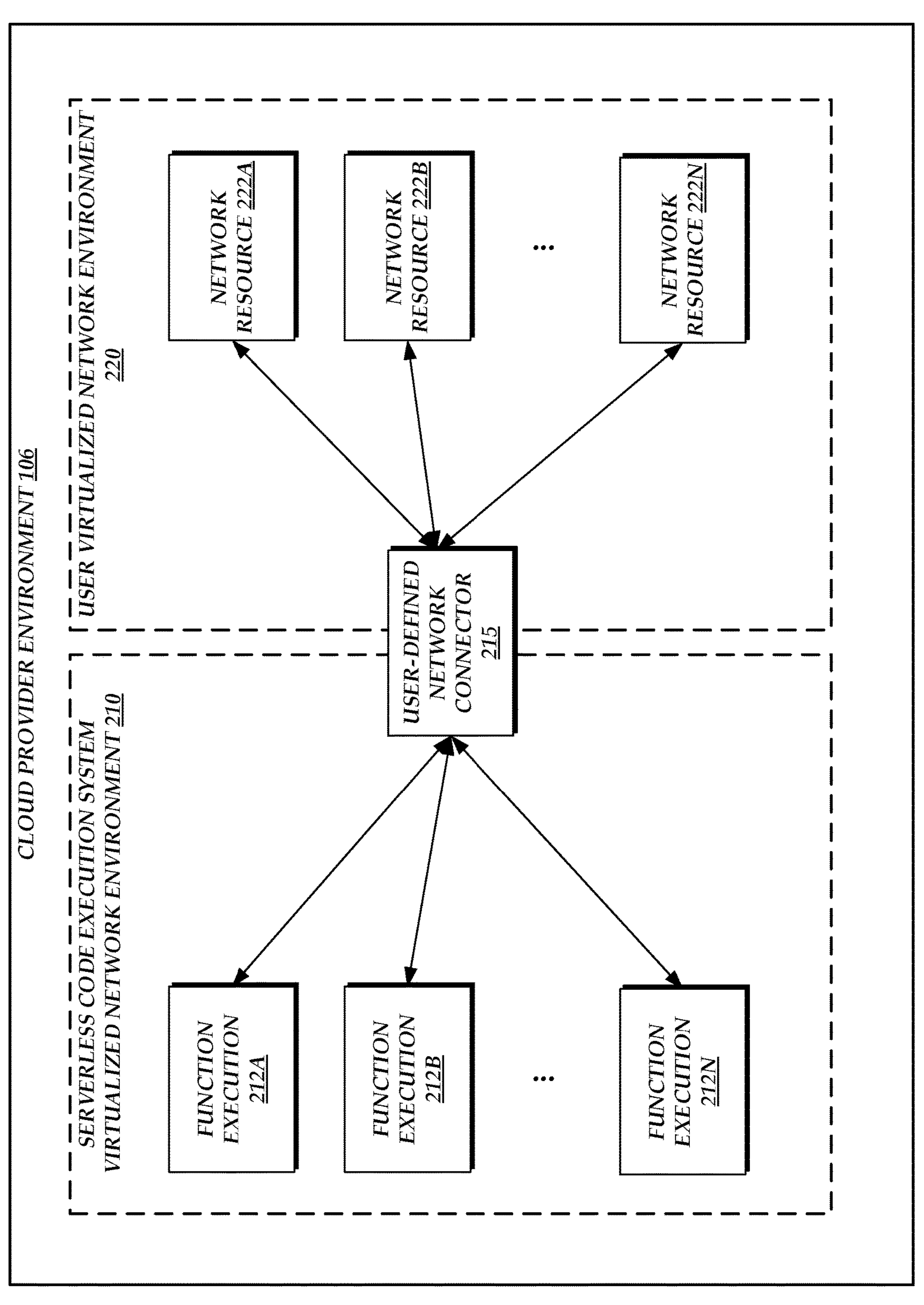
FIG. 2 depicts a logical view of how a connector of the cloud provider environment of FIG. 1 can enable network communication between two isolated virtualized network environments.

FIG. 2 depicts a logical view of how a connector of the cloud provider environment 106 can enable network communication between two isolated virtualized network environments. Specifically, FIG. 2 depicts communication between a serverless code execution system virtualized network environment 210 and a user virtualized network environment 220.

Illustratively, each VM instance 153 of FIG. 1 may be connected (via the virtualized networking service 109) to the serverless code execution system virtualized network environment 210, which represents a virtual network, such as a subnet, on the cloud provider environment 106. Accordingly, function executions 212A-N (each of which illustratively represents a process executing on a VM instance 153) may communicate with each other within the environment 210. The environment 210 may contain various additional network objects, not shown in FIG. 2, that provide additional network connectivities, controls or restrictions. For example, the environment 210 may include gateways that provide access to external networks (such as network 104), firewalls that restrict traffic on the environment 210, etc.

A user owning a given serverless function on the serverless code execution system 110 may desire to connect executions of the function to their own user virtualized network environment 220. Illustratively, the serverless function may, when executed, rely or operate on client network resources 222A-N, each of which represents a compute resource 111 owned by the user. The cloud provider environment 106 can facilitate such communication by enabling creation of a user-defined network connector 215. As disclosed herein, the connector 215 represents a logical network object (e.g., implemented by the virtualized networking service 109) that accepts traffic from function executions 212 in the serverless code executions system virtualized network environment 210 and routes that traffic to client network resources 222 in the use virtualized network environment 220. As noted above, routing may occur on the basis of cloud metadata. For example, traffic of a function execution 212 destined for a client network resource 222 may be encapsulated on a substrate network with an identifier of the function being executed, of the source environment 210, and of the target environment 220. The connector 215 may be configured to accept such traffic and route it appropriately based on the cloud metadata. The connector 215 can include additional networking functionalities. For example, the connector 215 may implement network address translation (NAT) between address spaces of the environments 210 and 220, may implement firewall rules with respect to traffic from either environment, or may implement other networking functionalities.

In one embodiment, the connector 215 is a logical representation of a pair of network interfaces connected via a routing service provided by the virtualized networking service 109. Illustratively, the connector may correspond to a first logical network interface in the serverless code execution system virtualized network environment 210 and a second logical network interface in the user virtualized network environment 220, which interfaces are connected via routing provided by the virtualized networking service 109. For example, each interface may accept traffic from their respective environments 210 and 220, append cloud metadata to such traffic such as a source and destination environment, a source or destination element such as a function execution 212 or network resource 222, etc. (e.g., via encapsulation), and forward the traffic with appended metadata to an internal routing service provided by the virtualized networking service 109 that routes the traffic to a corresponding interface within the destination environment. The corresponding interface may then receive the traffic, remove the cloud metadata (e.g., via decapsulation), and forward the traffic to the destination element. Permissions information may be applied at a source interface, a destination interface, or both. Additionally or alternatively, permissions information may be applied during routing of the traffic by the virtualized networking service 109.

In accordance with embodiments of the present disclosure, the connector 215 may be user defined and managed. For example, an owner of a serverless function 212 may request creation of a connector 215 and specify criteria for routing on the connector 215 (e.g., one or more respective functions and user virtualized network environments 220 that should be in communication via the connector 215). The owner may further specify permissions for traffic flowing across the connector 215. Illustratively, permissions may be in the form of firewall rules, specifying for example individual sources and destinations (e.g., as serverless functions and network resources 222) among other possible parameters. Unlike a traditional firewall, the individual sources and destinations may be specified by cloud metadata, thus enabling the connector 215 to implement the rules even as network parameters (such as network addresses) of sources and destinations vary. As discussed above, by decoupling creation and management of connectors 215 from creation and management of functions, issues related to transparent creation and management of connectors 215 are reduced or eliminated. For example, a user can be enabled to independently establish permissions of functions and connectors 215, independently throttle traffic on functions and connectors 215, independently manage scaling of functions and connectors 215, and the like.

As discussed above, in some embodiments a connector 215 may facilitate connections between serverless functions owned by a first entity and virtualized environments owned by a second entity. Illustratively, function executions 212 may be executions of a serverless function owned by a SaaS provider, while the network resources 222 and user virtualized network environment 220 may be owned by an end user of the SaaS provider. In such a configuration, the connector 215 may implement permissions of the function owner, the target virtualized network owner, or both. For example, each of the function owner and the target virtualized network owner may specify permissions for the connector defining how traffic is permitted to traverse the connector 215 (e.g., particular types of traffic permitted, volumes permitted, times permitted, etc.). In one instance, the connector 215 implements a minimum-mutually-allowed permissions model, such that traffic is permitted only when both permissions of a function owner and an owner of a target virtualized network are satisfied. Accordingly, both function owners and owners of virtualized networks on the cloud provider environment 106 can securely manage and control interactions between serverless functions and network resources 222 in user virtualized network environments 220.

While FIG. 2 depicts a single user-defined network connector 215 that spans the environments 210 and 220, other configurations are possible. For example, the connector 215 may logically exist within the environment 210 or within the environment 220, as opposed to spanning the environments. As another example, multiple connectors 215 may operate in conjunction with one another. For example, an owner of a function may specify a first connector 215 and permissions defining how executions of the serverless function can transmit and receive information at the first connector 215. The owner may further specify other connectors 215 that are permitted to communicate with the first connector 215. Similarly, an owner of the user virtualized network environment 220 may specify a second connector 215 and permissions defining how network resources 222 can transmit and receive information at the second connector 215. The owner may further specify other connectors 215 (e.g., the first connector) that are permitted to communicate with the second connector 215. Accordingly, traffic may flow from a function execution 212 to a network resource 222 or vice versa when permitted by the rules of the first and second connectors 215, as defined by the respective owners of the serverless function and the network resources 222. Accordingly, depiction of a single connector 215 in FIG. 2 is intended to be illustrative.

Figure 3:
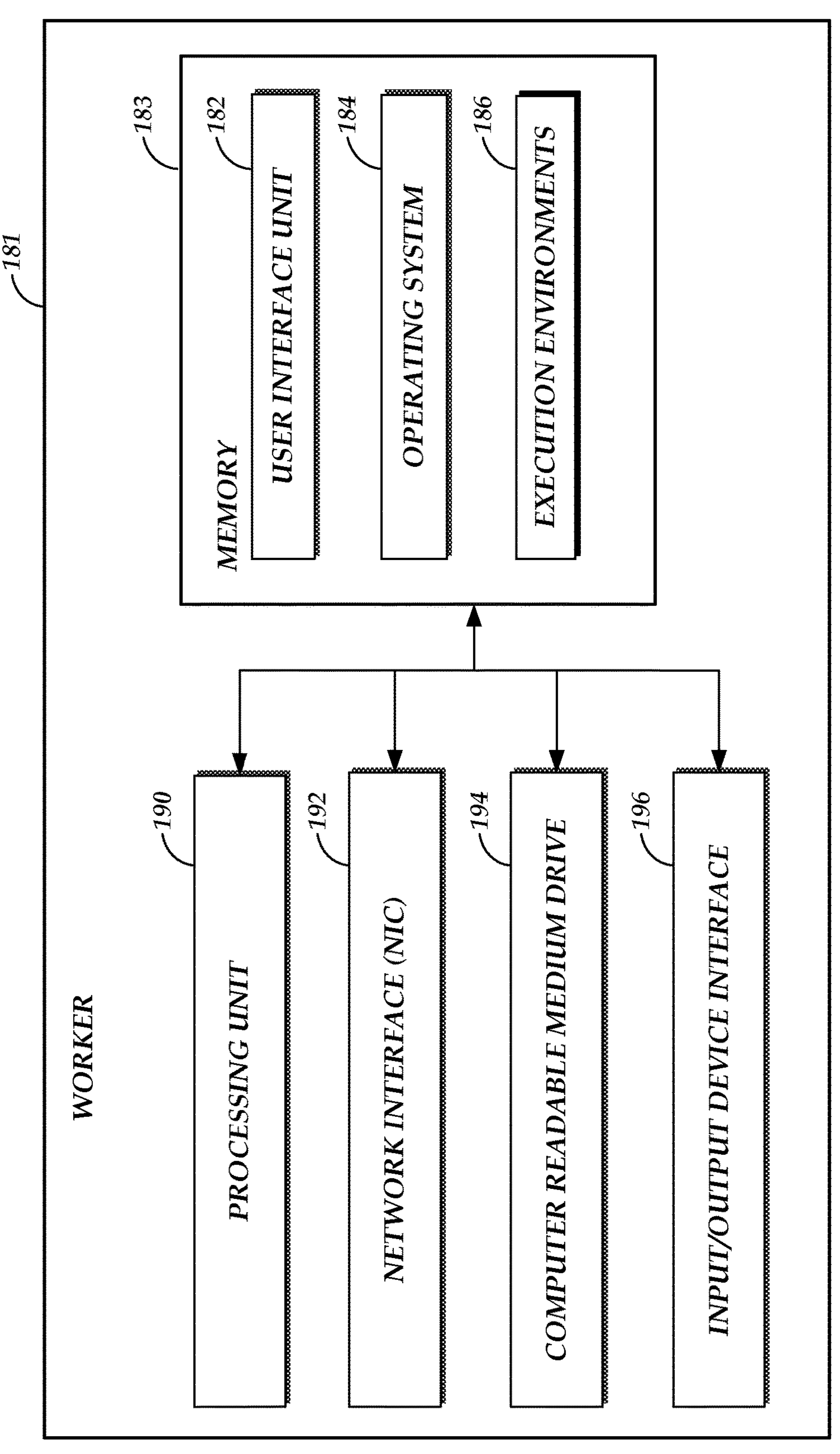
FIG. 3 depicts a general architecture of a computing device providing a worker of the serverless code execution system of FIG. 1 that may host an execution of a serverless function enabled to communicate with a user virtualized network environment via a user-defined connector.

FIG. 3 depicts a general architecture of a worker 151 that may execute serverless functions in accordance with embodiments of the present disclosure. The general architecture of the worker 151 depicted in FIG. 3 includes an arrangement of computer hardware and software modules that may be used to implement aspects of the present disclosure. The hardware modules may be implemented with physical electronic devices, as discussed in greater detail below. The worker 151 may include many more (or fewer) elements than those shown in FIG. 3. Additionally, the general architecture illustrated in FIG. 3 may be used to implement one or more of the other components illustrated in FIG. 1.

As illustrated, the worker 151 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 185 and further provide output information for an optional display (not shown) via the input/output device interface 196. The input/output device interface 196 may also accept input from an optional input device (not shown).

As illustrated, the worker 151 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network. The processing unit 190 may also communicate to and from memory 185 and further provide output information for an optional display (not shown) via the input/output device interface 196. The input/output device interface 196 may also accept input from an optional input device (not shown).

The memory 185 may contain computer program instructions (grouped as modules in some embodiments) that the processing unit 190 executes in order to implement one or more aspects of the present disclosure. The memory 185 generally includes random access memory (RAM), read only memory (ROM) and/or other persistent, auxiliary or non-transitory computer readable media. The memory 185 may store an operating system 184 that provides computer program instructions for use by the processing unit 190 in the general administration and operation of the worker 151. The memory 185 may further include computer program instructions and other information for implementing aspects of the present disclosure. For example, in one embodiment, the memory 185 includes a user interface unit 182 that generates user interfaces (and/or instructions therefor) for display upon a computing device, e.g., via a navigation and/or browsing interface such as a browser or application installed on the computing device. In addition, the memory 185 may include and/or communicate with one or more data repositories (not shown), for example, to access user program codes and/or libraries.

In addition to and/or in combination with the user interface unit 182, the memory 185 may include execution environments 186. In one embodiment, the execution environments 186 implement various aspects of the present disclosure. For example, the execution environments 186 can represent environments, such as containers or virtual machines, in which code corresponding to tasks on a serverless code execution system 110 are executed.

While the execution environments 186 are shown in FIG. 2 as part of worker 151, in other embodiments, all or a portion of the execution environments 186 may be implemented by other components of the serverless code execution system 110 and/or another computing device. For example, in certain embodiments of the present disclosure, another computing device in communication with the serverless code execution system 110 may include several modules or components that operate similarly to the modules and components illustrated as part of the worker 151.

Figure 4:
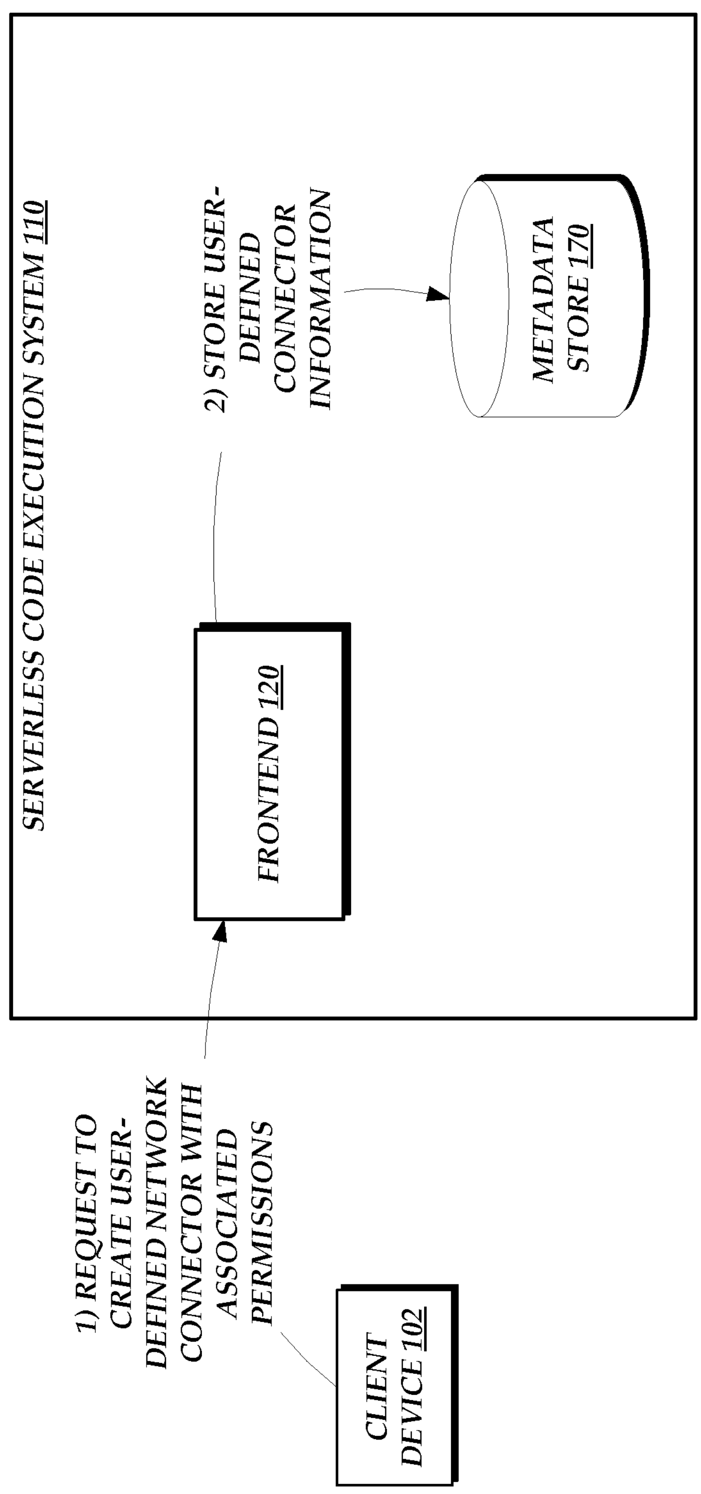
FIGS. 4 and 5 depict illustrative interactions for utilizing user-defined connectors to facilitate communications between executions of serverless functions and virtualized network environments.
Figure 5:
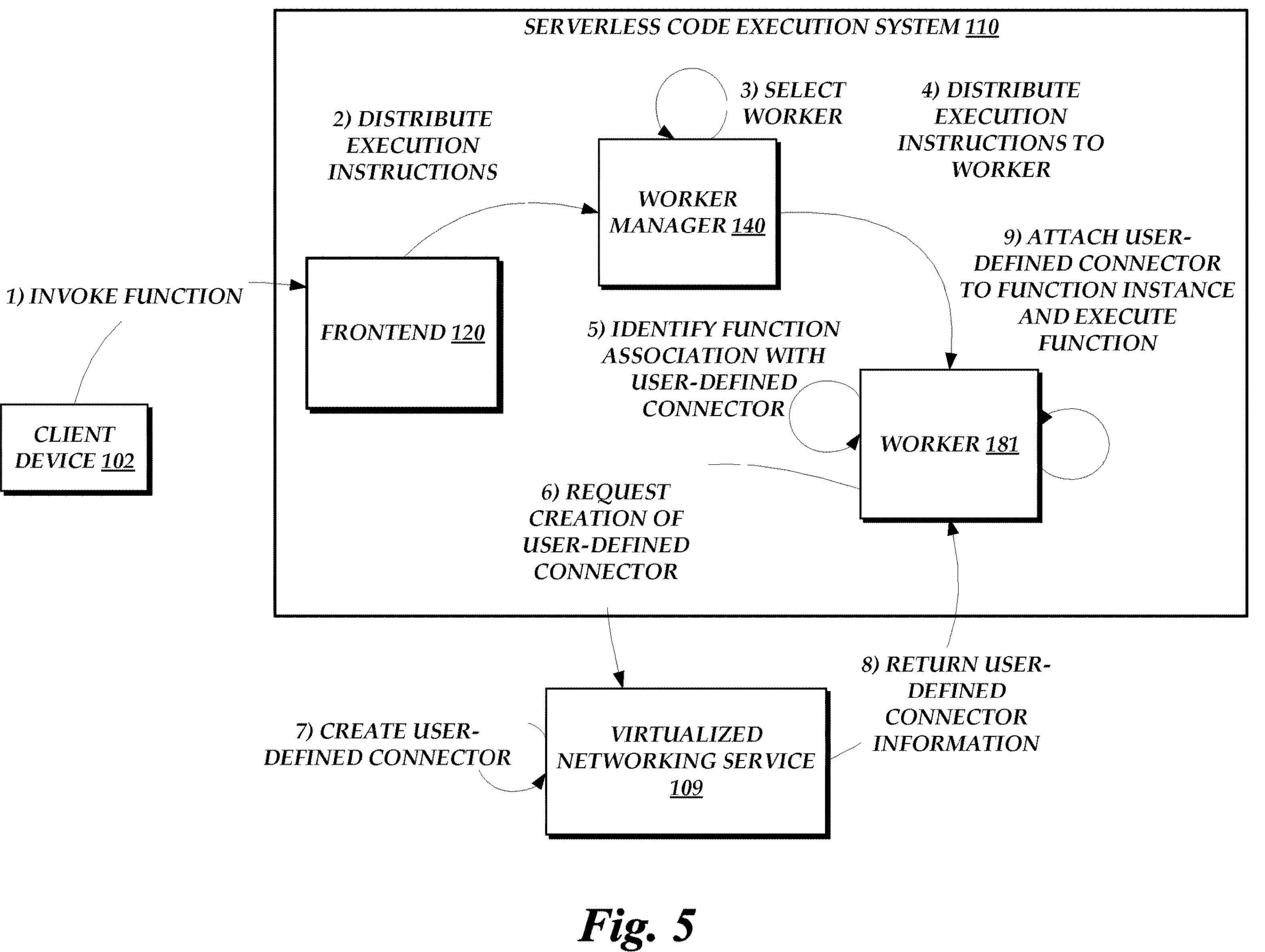

With reference to FIGS. 4 and 5, illustrative interactions will be described for utilizing user-defined connectors to facilitate communications between executions of serverless functions and virtualized network environments. Specifically, FIG. 4 depicts illustrative interactions for creation of a network connector facilitating communications between executions of serverless functions and virtualized network environments, including specification of permissions related to use of such a connector. FIG. 5 depicts illustrative interactions for dynamic instantiation of the connector during execution of a serverless function, thus permitting communication of the function execution with a virtualized network environment of the connector.

The interactions of FIG. 4 begin at (1), where a client device 102 transmits to the frontend 120 a request to create a user-defined connector. The request can include a variety of parameters relating to the connector. For example, the request may specify permissions for the connector, such as a type, amount, or timing of traffic that is permitted to flow across the connector. Illustratively, permissions may specify a volume of traffic permitted to flow across the connector, a number of simultaneous connections supported by the connector, or the like. Permissions may further specify one or more serverless functions (e.g., by unique identifier of the functions) whose executions are permitted to utilize the connector. In some embodiments, permissions may specify target virtualized network environments to which the connector should link executions. The frontend 120 may store these permissions in the metadata store 170.

While FIG. 4 depicts connector-centric permissions, in some embodiments permissions are additionally or alternatively specified with respect to logical entities that are permitted to utilize a connector. For example, a frontend 120 may enable a client device 102 to create a connector via interactions of FIG. 4 without specifying serverless functions or virtualized network environments to associate with the connector. The frontend 120 may then return a unique identifier of the connector to the client device 102. The client device 102 may in turn interact with the frontend 120 (or other interface, such as an interface of the virtualized networking service 109) to permit the connector to be associated with executions of one or more serverless functions or with virtualized network environments. For example, a client device 102 may modify permissions of a serverless function to enable the function to access a connector, by specifying the unique identifier of the connector in the permissions of the function. Similarly, a client device 102 may modify permissions of a virtualized network environment to permit a connector to send and receive communications in the environment. As noted above, in some embodiments connectors may be used to connect executions of functions of one owner with an environment of another owner. Accordingly, permissions may be established by either or both such owners. For example, an owner of a serverless function may specify permissions for the connector with respect to data obtained from or sent to executions of the function, while an owner of a virtualized network environment may specify permissions for traffic flowing to or from that environment. Illustratively, permissions may be specified independently of the connector itself (e.g., by applying permissions at the function or the environment, respectively, with reference to an identifier of the connector). Additionally or alternatively, permissions may be specified at the connector by either or both owners. In one embodiment, the connector is logically associated with one of the two owners (e.g., an owner of a serverless function or an owner of a virtualized network environment, where such owners differ), and the cloud provider environment 106 enables this "owner of the connector" to take certain actions, such as deleting the connector, independent of permissions granted by other entities (e.g., permissions to send/receive from a given function or environment owned by an entity other than the owner of the connector).

In accordance with embodiments of the present disclosure, the serverless code execution system 110 may interact with virtualized networking service 109 to instantiate the connector as specified via the interactions of FIG. 4. Specifically, creation of a connector as a logical object may be conceptually divided from lifecycle management of the connector on the cloud execution system 106, such as starting or stopping the connector. For example, creation of a connector may include specifying permissions of a connector, while starting and stopping a connector may include modifying a configuration of the cloud provider environment 106 to facilitate operation of the connector, such as by creating network interfaces in respective virtualized environments that provide for traffic to flow between environments. Because such interfaces may consume resources in the respective environments (e.g., by requiring IP addresses to be allowed to the interfaces), conceptually dividing creation and lifecycle management can enable connectors to be created while delaying consumption of resources until the connector is started or initialized.

In one embodiment, users may directly manage lifecycle of a connector. For example, a user via a client device 102 may interact with a frontend 120 or the virtualized networking service 109 to start or stop a connector. In some instances, the frontend 120 can enable a user to stop a connector immediately, thus enabling a user to implement a "kill switch" should they for example believe unauthorized traffic is traversing the connector. In another embodiment, the serverless code execution system 110 manages lifecycle of a connector, programmatically starting the connector when a first execution of a serverless function associated with the connector occurs and programmatically starting the connector when a last execution a serverless function associated with the connector halts. In this manner, resources associated with running the connector (e.g., use of IP addresses within respective environments) can be limited to use while the connector is needed.

While the interactions of FIG. 4 describe creation of a connector with associated permissions, similar interactions may be used to alter or revoke permissions of a connector. In some instances, revocation of permissions results in immediate modification of the connector. For example, the frontend 120 may notify the virtualized networking service 109 when permission for a connector are modified, such that the virtualized networking service 109 immediately alters its operation to reflect the modified permissions.

Illustrative interactions for initializing a connector based on invocation of a serverless function with permissions to utilize the connector are shown in FIG. 5. The interactions of FIG. 5 begin at (1), where a client device 102 transmits a call to the frontend 120 to invoke execution of a serverless function (e.g., a function previously created on the system 110). While FIG. 5 depicts invocation of a serverless function by a client device 102, other devices may additionally or alternatively invoke execution of a serverless function.

At (2), the frontend 120 distributes execution instructions for the serverless function to a worker manager 140. For example, the frontend 120 may apply load balancing techniques to select a worker manager 140 from a set of worker managers 140 previously associated with the serverless function, or may newly assign a worker manager 140 to handle executions of the serverless function.

At (3), the worker manager 140 selects a worker 181 from the worker fleet 180 to execute the serverless function. Illustratively, the worker manager 140 may maintain a list of execution environments leased to the manager 140, serverless functions associated with each environment, and workers 181 on which the environments exist. The worker manager 140 can then select a particular worker 181 to which to distribute execution instructions for the serverless function and distribute such instructions, at (4). Illustratively, if the manager 140 has an active lease on an environment already associated with the serverless function (e.g., loaded with code and other requisite information for executing the serverless function) and that is idle (e.g., not currently executing another instance of the serverless function), the manager 140 can distribute instructions to the worker 181 hosting that environment to execute the serverless function within the environment. If the manager 140 does not have an active lease on an idle environment associated with the serverless function, the worker 181 can interact with the placement service 160 to obtain a lease to such an environment. As noted above, the placement service 160 can then identify a worker 181 with sufficient capacity to host such an environment, and return a lease to the manager 140 for the environment. The manager 140 (or in some instances the placement server 160) can then instruct a worker 181 hosting the environment to provision the environment for execution of the serverless function, such as by loading code of the serverless function in the environment.

In accordance with embodiments of the present disclosure, it may be beneficial for executions of serverless functions to interact with network resources within isolated, virtualized network environments. Accordingly, a worker 181 instructed to execute a serverless function associated with a connector can detect such association and, if necessary, instantiate a connector to facilitate sending and receiving data of the function execution through the connector to a target virtualized network environment. As such, at (5), the worker 181 identifies an association between the invoked serverless function and a user-defined connector (e.g., as created via the interactions of FIG. 4). For example, the worker 181 may retrieve function data from the metadata store 170 and detect, within the function data, an association with (e.g., permissions to access) a connector.

Thereafter, at (6), the worker 181 transmits a request to the virtualized networking service 109 to create the connector. The request may be conditional on an appropriate connector not already existing. For example, the worker 181 may specify a unique identifier of the connector and request creation only if the connector is not yet created. For the purposes of illustration, it is assumed herein that a connector has not yet been created when discussing FIG. 5. The request illustratively includes authentication information sufficient for the virtualized networking service 109 to validate the worker 181 as authorized to request creation of the connector. For example, the worker 181 may obtain, as part of execution instructions, authentication information that authenticates the worker 181 as part of the serverless code execution system 110, as authorized to execute the invoked function, etc. The virtualized network service 109 may inspect the authentication information to verify that the worker 181 is properly authenticated and authorized to request creation of the connector.

As such, the virtualized network service 109 at (7) creates the connector. As noted above, connectors are illustratively associated with pairs of logical network interfaces within respective environments, with each interface routing traffic between their respective environment and the virtualized networking service 109, which in turn may route the traffic to the other interface (while applying additional modifications, such as conducting NAT translation, applying firewall rules, etc.). Accordingly, creation of a connector can include creating an appropriate interface in each environment, including an environment associated with the serverless code execution system 110 and a target virtualized network environment associated with the connector (e.g., as specified in permissions for the connector). In some embodiments, creation of a connector may further include modification of the virtualized networking service 109 to facilitate routing between the respective interfaces.

While description is made herein with respect to a pair of interfaces, in some instances a connector may correspond to multiple pairs interfaces (e.g., one of each pair in a respective environment connected by the connector). For example, each interface may provide a given level of performance or a given set of resources (e.g., a given number of IP addresses, maximum connections, bandwidth, etc.). Where parameters of a connector require more performance or resources than available through a single interface, a connector may correspond to multiple pairs of interfaces. Illustratively, the virtualized networking service 109 can be configured to scale interfaces corresponding to a connector, e.g., by monitoring traffic flowing through current pairs of connectors and adding new pairs of connectors as required by that traffic until a maximum specified resource use or performance of the connector is achieved.

At (8), the virtualized networking service 109 returns to the worker 181 connector information enabling the worker 181 to associate an execution environment of the invoked serverless function with the connector. For example, the information may include identifying information of an interface corresponding to the connector that has been created, by the virtualized networking service 109, in a virtualized network environment of the serverless code execution system 110. Accordingly, at (9), the worker 181, using the returned information, attaches the user-defined connector to an execution environment for the invoked function (e.g., a VM instance 153 supporting execution of the function). For example, the worker 181 may provision the environment with network access via an interface for the connector, as identified in the return information, such that the environment can access the target virtualized network environment via the interface. Illustratively, the interface may be attached as a default network interface of the environment (e.g., "eth0"). The worker 181 then executes the serverless function. According, during execution, the code of the function may access resources of a target virtualized network environment associated with the connector via the connector, as discussed in more detail with respect to FIG. 2, above.

While FIG. 5 describes interactions to initialize a connector, embodiments of the present disclosure may additionally or alternatively stop a connector. For example, the serverless code execution system 110 or the virtualized networking service 109 may determine that no function execution is presently using a connector, and stop the connector by, for example, deleting the interface pairs associated with the connector. Similarly, the serverless code execution system 110 or the virtualized networking service 109 may scale down connectors (e.g., by deleting interface pairs) to adjust to lowered usage of a connector.

Figure 6:
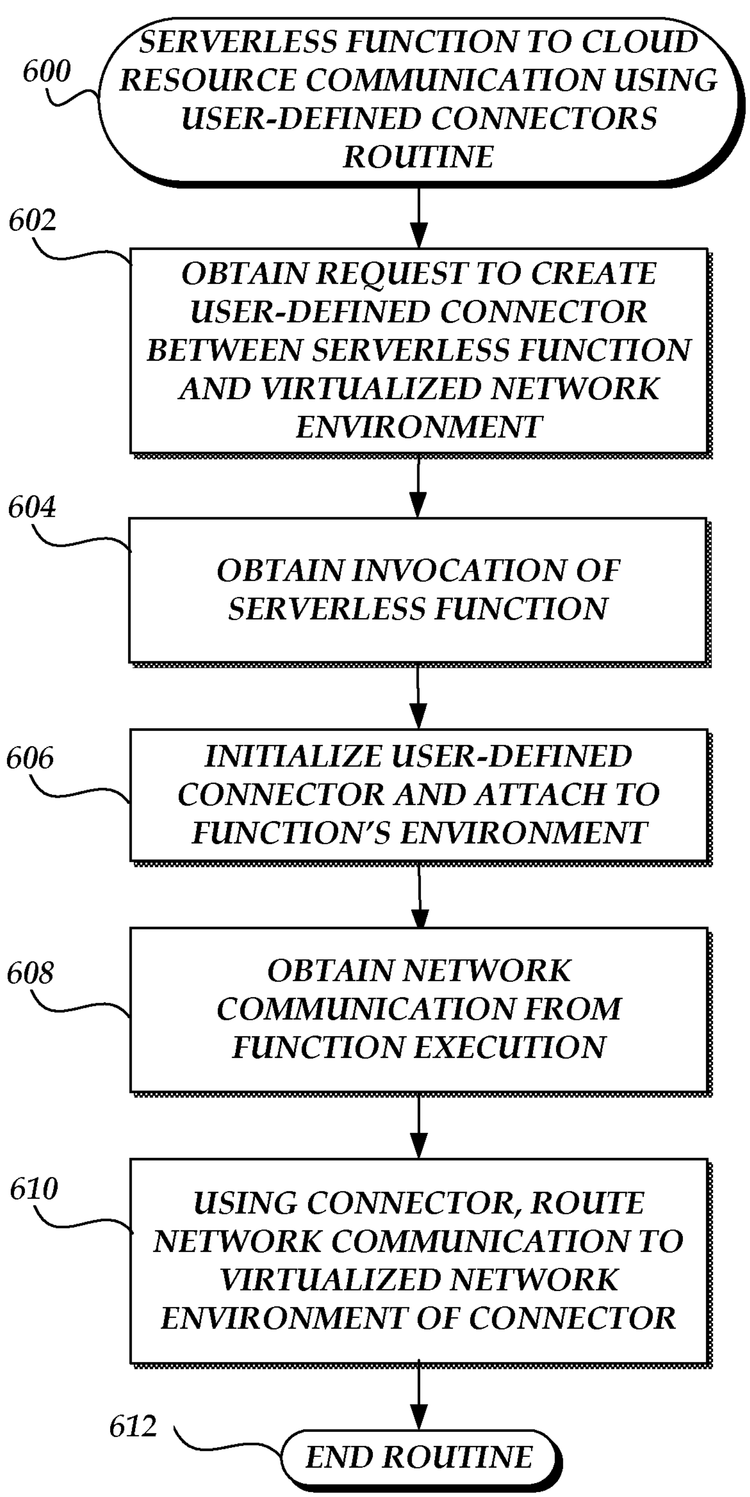
FIG. 6 is a flow chart depicting an illustrative routine for using user-defined connectors to provide communication between serverless functions and cloud resources in a virtualized network environment.

With reference to FIG. 6, an illustrative routine 600 will be described for using user-defined connectors to provide communication between serverless functions and cloud resources in a virtualized network environment (e.g., a VPC or VNet). The routine 600 may be implemented, for example, by the serverless code execution system 110 (e.g., in connection with the virtualized networking service 109).

The routine 600 begins at block 602, where the serverless code execution system 110 obtains a request to create a user-defined connector between (executions of) a serverless function and a virtualized network environment. The request can illustratively specify parameters of the connector, including permissions of the connector with respect to one or more serverless functions, permissions of the connector with respect to one or more user virtualized network environments, filtering to conduct on the connector (e.g., in the form of firewall rules), performance limits for the connector (e.g., a maximum bandwidth, number of connections, etc.), traffic shaping to perform on the connector, or the like. As discussed above, the request may be obtained from a client computing device 102 associated with an owner of the serverless function and the user virtualized network environment. (While a single owner of both the serverless function and the user virtualized network environment is assumed for purposes of description of FIG. 6, embodiments regarding distinct owners are contemplated and discussed, e.g., with reference to FIG. 7 below.)

While the routine 600 is described with respect to connector-centric permissions (e.g., permissions of a connector to access data of a given serverless function or virtualized network environment), the serverless code execution system 110 may additionally or alternatively obtain function- or virtualized environment-centric permissions (e.g., permissions of a function or environment to send data to or from a connector).

At block 604, the serverless code execution system 110 obtains an invocation of a serverless function associated with (e.g., with permissions to access) a user-defined connector. As noted above, the invocation may occur from a client computing device 102, from the serverless code execution system 110, or from other network-connected devices.

For purposes of illustration, it will be assumed that the invocation is a first invocation of a function associated with the connector, and thus that the connector should be initialized to facilitate acceptance of communications from the function. Accordingly, at block 606, the serverless code execution system 110 initializes the user-defined connector and attaches the connector to an execution environment for the invoked function. For example, the serverless code execution system 110 may transmit a request to the virtualized networking service 109 to initialize the connector, which may cause the service 109 to create an interface in a virtualized network environment of the serverless code execution system 110 that corresponds to the connector. The service 109 illustratively further creates an interface within the user virtualized network environment associated with the connector, and establishes routing rules such that traffic of the serverless-side interface is routed to the user virtualized network environment-side interface, and vice versa. The serverless code execution system 110 may then attach the interface to the execution environment, thus enabling the function, when executed in the environment, to communicate with the user virtualized network environment.

At block 608, the serverless code execution system 110 obtains a network communication from the execution of the function. For example, the serverless code execution system 110 may obtain network traffic at the serverless-side interface. Thereafter, at block 610, the serverless code execution system 110 routes the network communication to the user virtualized network environment on the "other side" of the connector. For example, the serverless code execution system 110 may encapsulate the network communication with cloud metadata include, for example, an identifier of the source serverless function and an identifier of the destination virtualized network environment. The serverless code execution system 110 can then pass the encapsulated traffic to the virtualized networking service 109, which may route the communication according to the cloud metadata to the corresponding interface in the user virtualized network environment (e.g., while applying filtering, throttling, shaping, etc. as set by parameters of the connector). Accordingly, the function, when executed, can communicate with network endpoints within the user virtualized network environment. Notably, such communication occurs on the basis of cloud metadata corresponding to permissions of the connector (e.g., an identifier of the serverless function and the user virtualized network environment). As such, users need not for example define IP routing rules to route between the function and the environment. Accordingly, routing of communications is simplified relative to IP-based routing. Moreover, because the connector is explicitly surfaced to the user (e.g., as opposed to transparently managed by the serverless code execution system 110), the user is enabled to control various aspects of communication, such as firewall rules to be applied, performance metrics for the connector, permissions for accessing the connector, etc. The routine 600 then ends at block 612.

Figure 7:
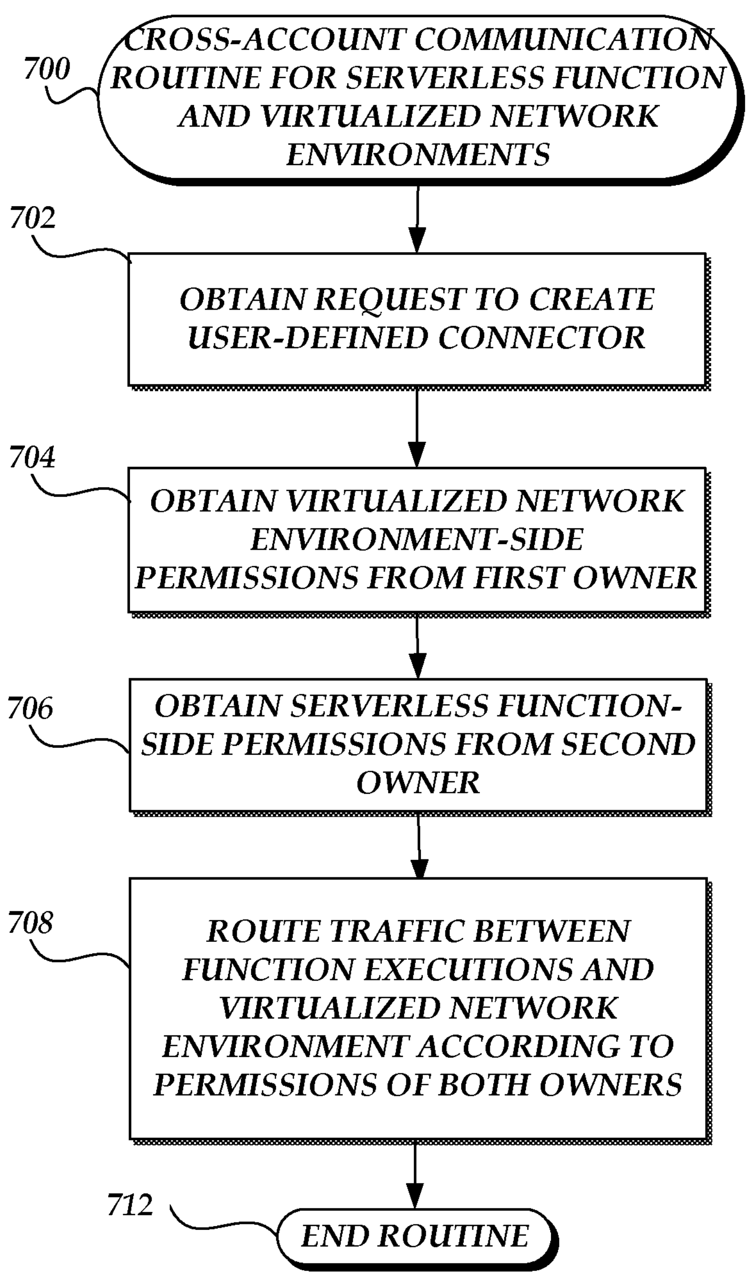
FIG. 7 is a flow chart depicting an illustrative routine for enabling cross-account communication between serverless function executions and virtualized network environments.

With reference to FIG. 7, an illustrative routine 700 will be described for enabling cross-account communication between serverless function executions and virtualized network environments. The routine 700 may be implemented, for example, by the cloud provider environment 106 of FIG. 1. Illustratively, the routine 700 may be utilized to enable a serverless function owned by a first account (the "owner" of the function) to, when executed, communicate with a virtualized network environment (e.g., resources within such environment) owned by a second account (the "owner" of the virtualized network environment). In this context, a resource being "owned by" a given account generally refers to the resource being hosted by the cloud provider system on behalf of that account. Accordingly, the routine 700 can enable for example a serverless function implementing SaaS functionality on behalf of a SaaS provider to securely access network resources of an end user of the SaaS provider while such resources are secured within a virtualized network environment of the end user. Notably, such communications need not be specified in terms of a particular configuration of network environments for the serverless function or target network resources-rather, a connector in accordance with embodiments of the present disclosure can enable for cross-account communication on the basis of cloud metadata, such as a unique identifier of the serverless function and a user virtualized network environment to be accessed by the serverless function. Thus, the routine 700 enables secure, simplified cross-account communication relative to other methods such as IP routing.

The routine 700 begins at block 702, where the cloud provider environment 106 obtains a request to create a user-defined connector between virtualized network environments of the cloud provider environment 106. In one embodiment, the request specifies two virtualized network environments to be connected by the connector or at least one of the virtualized network environments. For example, the request may indicate that the connector corresponds to a serverless function corresponding to a first virtualized network environment (e.g., an environment of a serverless computing system), thus specifying the first virtualized network environment. In another example, the request may indicate that the connector corresponds to a user virtualized network environment. In another embodiment, the request may not specify a particular virtualized network environment. The request may illustratively be obtained from one of two (or more) accounts with cloud resources to be connected by the connector. For example, where a connector is intended to connect a serverless function of a SaaS provider with a virtual network environment of an end user of the SaaS provider, the request may be obtained from the SaaS provider or from the end user. Illustratively, the cloud provider environment 106 may host the connector on behalf of a requesting entity, such that the connector is "owned" by the requesting account. Ownership of a connector may enable the owning account to, for example, initialize the connector, stop the connector, destroy the connector, or the like.

In some instances, the request can specify parameters for the connector. Illustratively, parameters may include performance metrics for the connector, such as minimum or maximum performance metrics in terms of, e.g., simultaneous network connections, total bandwidth, or the like. Parameters may further include filters or rules to apply to traffic traversing the connector, such as firewall rules for permitting or denying specific traffic, as defined in the rules, to pass through the connector.

At block 704, the cloud provider environment 106 obtains, from a client computing device 102 authorized by a user account owning a user virtualized network environment, permissions permitting the logical network connector to join the user virtualized network environment. Such permissions are referred to herein for ease of reference as "virtualized network environment-side permissions." As these permission are obtained from a user account owning the user virtualized network environment, these permissions permit the account to limit how network communications traversing the connector interact with resources on the user virtualized network environment. For example, in addition to permitting the connector to join the environment, the virtualized network environment-side permissions may specify individual network objects in the user virtualized network environment that may be accessed via the connector, firewall or routing rules for traffic entering the user virtualized network environment from the connector, or the like.

In some embodiments, the virtualized network environment-side permissions may further specify permissions for traffic entering an opposing side of the connector. For example, where the user virtualized network environment is owned by an account corresponding to an end user of a SaaS provider, the virtualized network environment-side permissions may specify individual serverless functions of the SaaS provider that are permitted to send and/or receive traffic via the connector. In other embodiments, the virtualized network environment-side permissions do not specify permissions for traffic entering an opposing side of the connector. For example, where a connector is owned by a SaaS provider and a user virtualized network environment is owned by an account corresponding to an end user of a SaaS provider, the virtualized network environment-side permissions may omit specification of particular serverless functions permitted to use the connector. In this way, the account of the user virtualized network environment need not be aware of, e.g., particular functions used by the SaaS provider to facilitate services.

At block 706, the cloud provider environment 106 obtains, from a client computing device 102 authorized by a user account owning a serverless function, permissions permitting the logical network connector to act as a network endpoint for traffic of executions of the serverless function. Such permissions are referred to herein for ease of reference as "serverless function-side permissions." As these permission are obtained from a user account owning the serverless function, these permissions permit the account owning the serverless function to limit how executions of the serverless function interactions with the connector interact. For example, in addition to permitting the connector to accept or deliver traffic to executions of the serverless function, the serverless function-side permissions may specify firewall or routing rules for traffic traversing the connector from or two executions of the serverless function, parameters for such traffic (e.g., a maximum number of connections, a maximum bandwidth use, etc.), or the like.

In some embodiments, the serverless function-side permissions may further specify permissions for traffic entering an opposing side of the connector. For example, where the serverless function is owned by an account corresponding to a SaaS provider, the serverless function-side permissions may specify individual network objects of an opposite-side user virtualized network environment that the serverless function is permitted to access or permitted to accept traffic from or permitted types of such network objects.

In other embodiments, the serverless function-side permissions do not specify permissions for traffic entering an opposing side of the connector. For example, where a connector is owned by a SaaS provider and a user virtualized network environment is owned by an account corresponding to an end user of a SaaS provider, the serverless function-side permissions may omit specification of individual network objects of an opposite-side virtualized network environment permitted to use the connector. In this way, account owning a serverless function may not be required to have knowledge of particular network objects in another account's user virtualized network environment. Rather, use of a connector may enable the account owning the user virtualized network environment to permit controlled access to the environment by serverless functions of other accounts, without disclosing details of the environment to the other account. Illustratively, the virtualized network environment-side permissions may specify routing rules to direct traffic from the connector owned by a SaaS provider to a particular network object in the user virtualized network environment and omit specification of particular serverless functions permitted to use the connector, while the serverless functions-side permissions may specify serverless functions permitted to access the connector while omitting specification of individual network objects of an opposite-side user virtualized network environment permitted to use the connector. In such a configuration, a connector enables cross-account communication between resources of the SaaS provider and resources of the user virtualized network environment without disclosing potentially confidential information of each party to the other.

In one embodiment, permissions (environment-side, serverless-function side, or both) are specified explicitly, such as by communication from a client device 102. In another embodiment, permissions may be specified implicitly. For example, the cloud provider environment 106 may be configured to determine that creation of a connector by a user associated with a given account provides implicit permission to access resources of the given account. As another example, the cloud provider environment 106 may be configured to determine that a logical grouping of a connector (e.g., within a group also including other resources, such as VPC resources or serverless functions) on the cloud provider environment 106 provides implicit permission for the connector to access such resources. Thus, the cloud provider environment 106 may avoid a need to obtain explicit environment-side, serverless-function side permissions, or both.

At block 708, the cloud provider environment 106 routes traffic between an execution of the serverless function and the user virtualized network environment according to the virtualized network environment-side and the serverless functions-side permissions. As noted above, routing traffic may include provisioning a pair of endpoints, such as virtual network interfaces, in each respective environment (e.g., the user virtual network environment and a second virtual network environment in which an execution environment for the serverless function is hosted) and configuring a substrate network to route traffic between the two endpoints. As discussed above, each endpoint may function to accept traffic from permitted network objects in the respective environments, encapsulate the traffic with cloud metadata facilitating routing on the substrate network (such as identifiers of a source or destination virtualized network environment, an identifier of the serverless function, or the like), and forward the traffic via the substrate network to a destination environment. Each endpoint may further function to decapsulate traffic from the opposing endpoint in the pair and forward the traffic within the destination virtual network environment. In one embodiment, serverless function-side permission are enforced via an endpoint within the virtual network environment of a serverless function, and virtual network environment-side permissions are enforced via an endpoint within the user virtual network environment. Accordingly, traffic across the connector may be required to satisfy both sets of permissions. In this manner, the routine 700 provides for secure cross-account communication between executions of serverless functions and user virtual network environments. The routine 700 then ends at block 712.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A cloud provider system to enable cross-account communication between serverless function executions and virtualized network environments, the cloud provider system comprising:

one or more computing devices hosting a user virtualized network environment containing one or more network accessible resources, wherein the user virtualized network environment is hosted on behalf of a first user account on the cloud provider system and a serverless code execution system hosting executions of a user-defined serverless function on behalf of a second user account on the cloud provider system, wherein the second user account is distinct from the first user account; and one or more processors configured to:

obtain a request to create a logical network connector enabling communication between the user virtualized network environment hosted on behalf of the first user account and the executions of the user-defined serverless function hosted on behalf of the second user account on the cloud provider system;

obtain, from a client computing device authorized by the first user account, first permissions permitting the logical network connector to join the user virtualized network environment hosted on behalf of the first user account;

obtain, from a client computing device authorized by the second user account, second permissions permitting the logical network connector to act as a network endpoint for traffic of executions of the user-defined serverless function hosted on behalf of the second user account;

responsive to receiving the first permissions from the client computing device authorized by the first user account and receiving the second permissions from the client computing device authorized by the second user account, initialize the logical network connector, wherein initializing the logical network connector comprises:

generating a first endpoint within the user virtualized network environment hosted on behalf of the first user account;

generating a second endpoint within a second virtualized network environment corresponding to the serverless code execution system hosting the executions of the user-defined serverless function on behalf of the second user account on the cloud provider system; and configuring a substrate physical network to route traffic between endpoints respectively associated with the first user account and the distinct second user account, the endpoints including the first endpoint within the user virtualized network environment hosted on behalf of the first user account and the second endpoint within the second virtualized network environment corresponding to the serverless code execution system hosting the executions of the user-defined serverless function on behalf of the second user account;

obtain, at the first endpoint represented by the logical network connector within the user virtualized network environment hosted on behalf of the first user account, a network communication from an execution of user-defined code representing the user-defined serverless function on the serverless code execution system; and using the logical network connector, route the network communication to the user virtualized network environment hosted on behalf of the first user account subject to the first permissions obtained from the client computing device authorized by the first user account and the second permissions obtained from the client computing device authorized by the second user account.

2. The cloud provider system of claim 1, wherein configuring the substrate physical network to route traffic between the first and second endpoints comprises configuring the substrate physical network to route traffic between the first and second endpoints based at least in part on metadata of the user virtualized network environment and the second virtualized network environment on the substrate physical network.

3. The cloud provider system of claim 2, wherein the first endpoint is configured to encapsulate the network communication with metadata of the second virtualized network environment to result in encapsulated network communication and to forward the encapsulated network communication via the substrate physical network.

4. The cloud provider system of claim 2, wherein at least one of the first permissions and the second permissions specify firewall rules to be applied to network transmissions traversing the logical network connector, and wherein routing the network communication subject to the permissions comprises routing the network communication subject to the firewall rules.

5. A method implemented at a cloud provider system hosting a user virtualized network environment containing one or more network accessible resources, wherein the user virtualized network environment is hosted on behalf of a first user account on the cloud provider system, and a serverless code execution system hosting executions of a user-defined serverless function on behalf of a second user account on the cloud provider system, wherein the second user account is distinct from the first user account, the method comprising:

obtaining a request to create a logical network connector enabling communication between the user virtualized network environment hosted on behalf of the first user account and the executions of the user-defined serverless function hosted on behalf of the second user account on the cloud provider system;

obtaining, from a client computing device authorized by the first user account, first permissions permitting the logical network connector to join the user virtualized network environment hosted on behalf of the first user account;

obtaining, from a client computing device authorized by the second user account, second permissions permitting the logical network connector to act as a network endpoint for traffic of executions of the user-defined serverless function hosted on behalf of the second user account;

responsive to receiving the first permissions from the client computing device authorized by the first user account and receiving the second permissions from the client computing device authorized by the second user account, initializing the logical network connector, wherein initializing the logical network connector comprises:

generating a first endpoint within the user virtualized network environment hosted on behalf of the first user account;

generating a second endpoint within a second virtualized network environment corresponding to the serverless code execution system hosting the executions of the user-defined serverless function on behalf of the second user account on the cloud provider system; and configuring a substrate physical network to route traffic between endpoints respectively associated with the first user account and the distinct second user account, the endpoints including the first endpoint within the user virtualized network environment hosted on behalf of the first user account and the second endpoint within the second virtualized network environment corresponding to the serverless code execution system hosting the executions of the user-defined serverless function on behalf of the second user account; and using the logical network connector, routing one or more network communications from an execution of the user-defined serverless function on the serverless code execution system hosted on behalf of the second user account to the user virtualized network environment hosted on behalf of the first user account subject to the first permissions obtained from the client computing device authorized by the first user account and the second permissions obtained from the client computing device authorized by the second user account.

6. The method of claim 5, wherein the first permissions are specified independent of the user-defined serverless function, and wherein the second permissions are specified independent of the user virtualized network environment.

7. The method of claim 5, wherein the first permissions are specified by referencing a unique identifier of the logical network connector on the cloud provider system and a unique identifier of the user virtualized network environment on the cloud provider system.

8. The method of claim 5, wherein the second permissions are specified by referencing a unique identifier of the logical network connector on the cloud provider system and a unique identifier of the user-defined serverless function on the cloud provider system.

9. The method of claim 5, wherein the first endpoint corresponds to a virtualized network interface, and wherein initializing the logical network connector further comprises attaching the virtualized network interface to an execution environment supporting the execution of the user-defined serverless function.

10. The method of claim 5, wherein routing the one or more network communications comprises applying network address translation (NAT) to the one or more network communications to translate between an address space of the second virtualized network environment and an address space of the user virtualized network environment.

11. The method of claim 5 further comprising:

obtaining, at the second endpoint, a second network communication from the user virtualized network environment responsive to the network communication; and routing the second network communication to second virtualized network environment subject to the first permissions obtained from the client computing device authorized by the first user account and the second permissions obtained from the client computing device authorized by the second user account.

12. The method of claim 5, wherein routing the one or more network communications from the execution of the user-defined serverless function on the serverless computing system to the user virtualized network environment subject to the first permissions obtained from the client computing device authorized by the first user account and the second permissions obtained from the client computing device authorized by the second user account comprises routing the network communication to the user virtualized network environment subject to a minimum set of permissions shared by the first and second permissions.

13. The method of claim 5, wherein initializing the logical network connector is responsive to invocation of the user-defined serverless function.

14. The method of claim 5, wherein the request to create the logical network connector specifies throttling to be applied to traffic traversing the logical network connector, and wherein routing the network communication to the user virtualized network environment comprises routing the network communication to the user virtualized network environment subject to the throttling.

15. The method of claim 5, wherein the first and second endpoints correspond to a first endpoint pair, and wherein the method further comprises:

detecting that traffic at the first endpoint pair satisfies a scaling threshold;

generating a second endpoint pair including an additional endpoint within the user virtualized network environment and an additional endpoint within the second virtualized network environment corresponding to the serverless computing system; and configuring the substrate physical network to route traffic between the additional endpoints of the second endpoint pair.

16. The method of claim 5, wherein at least one of the first permissions and the second permissions specify firewall rules to be applied to network transmissions traversing the logical network connector, and wherein routing the one or more network communications comprises routing one or more network communications subject to the firewall rules.

17. One or more non-transitory computer-readable media comprising computer-executable instructions that, when executed by a cloud provider system hosting a user virtualized network environment containing one or more network accessible resources, the user virtualized network environment hosted on behalf of a first user account on the cloud provider system, and a serverless code execution system hosting executions of a user-defined serverless function on behalf of a second user account on the cloud provider system, wherein the second user account is distinct from the first user account, cause the cloud provider system to:

obtain a request to create a logical network connector enabling communication between the user virtualized network environment and the executions of the user-defined serverless function hosted on behalf of the second user account on the cloud provider system;

obtain, from a client computing device authorized by the first user account, first permissions permitting the logical network connector to join the user virtualized network environment hosted on behalf of the first user account;

obtain, from a client computing device authorized by the second user account, second permissions permitting the logical network connector to act as a network endpoint for traffic of executions of the user-defined serverless function hosted on behalf of the second user account;

responsive to receiving the first permissions from the client computing device authorized by the first user account and receiving the second permissions from the client computing device authorized by the second user account, initialize the logical network connector, wherein initializing the logical network connector comprises:

generating a first endpoint within the user virtualized network environment hosted on behalf of the first user account;

generating a second endpoint within a second virtualized network environment corresponding to the serverless code execution system hosting the executions of the user-defined serverless function on behalf of the second user account on the cloud provider system; and configuring a substrate physical network to route traffic between endpoints respectively associated with the first user account and the distinct second user account, the endpoints including the first endpoint within the user virtualized network environment hosted on behalf of the first user account and the second endpoint within the second virtualized network environment corresponding to the serverless code execution system hosting the executions of the user-defined serverless function on behalf of the second user account; and using the logical network connector, route one or more network communications from an execution of the user-defined serverless function on the serverless code execution system hosted on behalf of the second user account to the user virtualized network environment hosted on behalf of the first user account subject to the first permissions obtained from the client computing device authorized by the first user account and the second permissions obtained from the client computing device authorized by the second user account.

18. The one or more non-transitory computer-readable media of claim 17, wherein at least one of the first permissions and the second permissions specify firewall rules to be applied to network transmissions traversing the logical network connector, and wherein routing the one or more network communications comprises routing one or more network communications subject to the firewall rules.

19. The one or more non-transitory computer-readable media of claim 17, wherein routing the one or more network communications from the execution of the user-defined serverless function on the serverless code execution system to the user virtualized network environment subject to the first permissions obtained from the client computing device authorized by the first user account and the second permissions obtained from the client computing device authorized by the second user account comprises routing the network communication to the user virtualized network environment subject to a minimum set of permissions shared by the first and second permissions.

20. The one or more non-transitory computer-readable media of claim 17, wherein the first permissions are specified independent of the user-defined serverless function, and wherein the second permissions are specified independent of the user virtualized network environment.

* * * * *